US012801697B2

(12) United States Patent
Fischer et al.

(10) Patent No.: US 12,801,697 B2
(45) Date of Patent: Nov. 17, 2026

(54) SYSTEM AND A METHOD FOR BIAS ESTIMATION IN ARTIFICIAL INTELLIGENCE (AI) MODELS USING DEEP NEURAL NETWORK

(71) Applicant: Deutsche Telekom AG., Bonn (DE)

(72) Inventors: Sebastian Fischer, Berlin (DE); Ronald Fromm, Berlin (DE); Amit Hacmon, Beer Sheva (IL); Yuval Elovici, Arugot (IL); Asaf Shabtai, Hulda (IL); Edita Grolman, Beer Sheva (IL); Oleg Brodt, Beer Sheva (IL)

(73) Assignee: Deutsche Telekom AG, Bonn (DE)

( * ) Notice: Subject to any disclaimer, the term of this patent is extended or adjusted under 35 U.S.C. 154(b) by 1231 days.

(21) Appl. No.: 17/467,338

(22) Filed: Sep. 6, 2021

(65) Prior Publication Data

US 2022/0101062 A1 Mar. 31, 2022

Related U.S. Application Data

(60) Provisional application No. 63/075,301, filed on Sep. 7, 2020.

(51) Int. Cl.

| | |
|---|---|
| ***G06F 18/21*** | (2023.01) |
| ***G06F 18/214*** | (2023.01) |
| ***G06N 3/088*** | (2023.01) |

(52) U.S. Cl.

CPC .......... *G06F 18/217* (2023.01); *G06F 18/214* (2023.01); *G06N 3/088* (2013.01)

(58) Field of Classification Search

CPC .... G06N 3/045; G06N 3/0442; G06N 3/0464; G06N 3/0475; G06N 3/0455; G05B 13/027

See application file for complete search history.

(56) References Cited

PUBLICATIONS

Liang et al., "Towards Debiasing Sentence Representations", arXiv:2007.08100v1 [cs.CL] Jul. 16, 2020 (Year: 2020).*

(Continued)

*Primary Examiner* — Kakali Chaki
*Assistant Examiner* — Josep Han
(74) *Attorney, Agent, or Firm* — Fenwick & West LLP

(57) ABSTRACT

A system for bias estimation in Artificial Intelligence (AI) models using a pre-trained unsupervised deep neural network, comprising a bias vector generator implemented by at least one processor that executes an unsupervised DNN with a predetermined loss function. The bias vector generator is adapted to store a given ML model to be examined, with predetermined features; store a test-set of one or more test data samples being input data samples; receive a feature vector consisting of one or more input samples; output a bias vector indicating the degree of bias for each feature, according to said one or more input samples. The system also comprises a post-processor which is adapted to receive a set of bias vectors generated by said bias vector generator; process said bias vectors; calculate a bias estimation for every feature of said ML model, based on predictions of said ML model; provide a final bias estimation for each examined feature.

14 Claims, 2 Drawing Sheets

(56) References Cited

PUBLICATIONS

Ren et al, "Adversarial Attacks and Defenses in Deep Learning", available online Jan. 3, 2020, https://doi.org/10.1016/j.eng.2019.12.012 2095-8099/ 2020 The Authors. Published by Elsevier LTD on behalf of Chinese Academy of Engineering and Higher Education Press Limited Company (Year: 2020).*
Grari et al, "Fairness-Aware Neural Reyni Minimization for Continuous Features" , arXiv:1911.04929v1 [cs.LG] Nov. 12, 2019 (Year: 2019).*
Elazar et al, "Adversarial Removal of Demographic Attributes from Text Data" arXiv:1808.06640v2 [cs.CL] Sep. 2, 2018 (Year: 2018).*
Lauscher et al., "A General Framework for Implicit and Explicit Debiasing of Distributional Word Vector Spaces" The Thirty-Fourth AAAI Conference on Artificial Intelligence (AAAI-20) (Year: 2020).*
Sirangi et al., "Customer Lifetime Value Modelling with Gradient Boosting" (hereinafter Sirangi).Journal of Information Systems Engineering and Management 2019 e-ISSN: 2468-4376 (Year: 2019).*
Wang et al., "Balanced Datasets Are Not Enough: Estimating and Mitigating Gender Bias in Deep Image Representations" Proceedings of the IEEE/CVF International Conference on Computer Vision (ICCV), 2019 (Year: 2019).*
Ali, M. et al. "Discrimination through Optimization: How Facebook's Ad Delivery Can Lead to Biased Outcomes." Proceedings of the ACM on Human-Computer Interaction, vol. 3, No. CSCW, Nov. 2019, pp. 1-30.
Angwin, J. et al. "Machine Bias." ProPublica.org, 25 pages, May 23, 2016, [Online] [Retrieved Jan. 24, 2022], Retrieved from the Internet <URL:https://www.propublica.org/article/machine-bias-risk-assessments-in-criminal-sentencing>.
Berk, R. et al. "Fairness in Criminal Justice Risk Assessments: The State of the Art." Sociological Methods & Research, 2018, pp. 1-42.
Blake, C. et al. "Adult Data Set." UCI Repository of Machine Learning Databases, 1998, 5 pages, [Online] [Retrieved Feb. 23, 2022], Retrieved from the Internet <URL:http://archive.ics.uci.edu/ml/datasets/Adult>.
Buolamwini, J. et al. "Gender Shades: Inter-Sectional Accuracy Disparities in Commercial Gender Classification." Proceedings of Machine Learning Research, vol. 81, 2018, pp. 1-15.
Calders, T. et al. "Building Classifiers with Independency Constraints." IEEE International Conference on Data Mining Workshops, Dec. 6, 2009, pp. 1-11.
Calders, T. et al. "Controlling Attribute Effect in Linear Regression." IEEE 13th International Conference on Data Mining, Dec. 7-10, 2013, pp. 71-80.
Chouldechova, A. "Fair Prediction with Disparate Impact: A Study of Bias in Recidivism Prediction Instruments." Big Data, vol. 5, No. 2, Jun. 1, 2017, pp. 153-163.
Dwork, C. et al. "Fairness Through Awareness." Proceedings of the 3rd Innovations in Theoretical Computer Science Conference, Jan. 2012, pp. 214-226.
European Patent Office, Extended European Search Report, European Patent Application No. 21195248.6, Feb. 11, 2022, six pages.
Feldman, M. et al. "Certifying and Removing Disparate Impact." Proceedings of the 21th ACM SIGKDD International Conference on Knowledge Discovery and Data Mining, Aug. 2015, pp. 259-268.
Friedler, S. A. et al. "A Comparative Study of Fairness-Enhancing Interventions in Machine Learning." Proceedings of the Conference on Fairness, Accountability, and Transparency, Jan. 2019, pp. 329-338.
Fukuchi, K. et al. "Prediction with Model-Based Neutrality." IEICE Transactions on Information and Systems, vol. E98-D, No. 9, Aug. 2015, pp. 1503-1516.
Hardt, M. et al. "Equality of Opportunity in Supervised Learning." 30th Conference on Neural Information Processing Systems (NIPS 2016), vol. 29, Barcelona, Spain, 2016, pp. 1-9.
Kamiran, F. et al. "Classifying Without Discriminating." 2nd International Conference on Computer, Control and Communication, Karachi, Pakistan, Feb. 17-18, 2009, pp. 1-6.
Li, Z. et al. "Reject Inference in Credit Scoring Using Semi-Supervised Support Vector Machines." Expert Systems with Applications, vol. 74, May 15, 2017, pp. 105-114.
Malgieri, G. et al. "The Concept of Fairness in the GDPR: A Linguistic and Contextual Interpretation." Proceedings of the 2020 Conference on Fairness, Accountability, and Transparency, Jan. 27-30, 2020, pp. 154-166.
Mehrabi, N. et al. "A Survey on Bias and Fairness in Machine Learning." ACM Computing Surveys, vol. 54, No. 6, arXiv:1908.09635v2, Sep. 17, 2019, pp. 1-31.
Narayanan, A. "Translation Tutorial: 21 Fairness Definitions and Their Politics." Proceedings of Conference on Fairness, Accountability, and Transparency, Mar. 1, 2018, 2 pages, [Online] [Retrieved Jan. 25, 2020], Retrieved from the Internet <URL:https://www.youtube.com/watch?v=wqamrPkF5kk>.
Ntoutsi, E. et al. "Bias in Data-Driven AI Systems—An Introductory Survey." arXiv Preprint arXiv:2001.09762v1, Jan. 14, 2020, pp. 1-19.
Obermeyer, Z. et al. "Dissecting Racial Bias in an Algorithm Used to Manage the Health of Populations." Science, vol. 366, No. 6464, Oct. 25, 2019, pp. 447-453.
Saleiro, P. et al. "Aequitas: A Bias and Fairness Audit Toolkit." arXiv Preprint arXiv:1811.05577v2, Apr. 29, 2019, pp. 1-19.
Verma, S. et al. "Fairness Definitions Explained." IEEE/ACM International Workshop on Software Fairness (FairWare), Gothenburg, Sweden, May 29, 2018, pp. 1-7.
Wilson, B. et al. "Predictive Inequity in Object Detection." Computer Vision and Pattern Recognition, arXiv Preprint arXiv:1902.11097v1, Feb. 21, 2019, pp. 1-13.
Zliobaite, I. "On the Relation Between Accuracy and Fairness in Binary Classification." Machine Learning, arXiv Preprint arXiv:1505.05723v1, May 21, 2015, pp. 1-5.
Zliobaite, I. "Measuring Discrimination in Algorithmic Decision Making." Data Mining and Knowledge Discovery, vol. 31, Mar. 31, 2017, pp. 1060-1089.

* cited by examiner

SYSTEM AND A METHOD FOR BIAS ESTIMATION IN ARTIFICIAL INTELLIGENCE (AI) MODELS USING DEEP NEURAL NETWORK

FIELD OF INVENTION

The present invention relates to the field of Artificial Intelligence (AI) and Machine Learning (ML). More particularly, the present invention relates to a system and a method for bias estimation in Artificial Intelligence (AI) models, using an unsupervised Deep Neural Network (DNN).

BACKGROUND OF THE INVENTION

Machine learning fairness has been addressed from various social and ethical perspectives (Mehrabi et al. 2019). The most common one is group fairness (Dwork et al. 2012; Verma and Rubin 2018; Mehrabi et al. 2019), which is the absence of unethical discrimination towards any of the data distribution groups. For example, group fairness is present in the gender feature when men and women are treated similarly by the ML model (i.e., discrimination towards one of them is not present). When an ML model demonstrates discrimination, it might be biased towards at least one of the data subgroups, i.e., men or women. Several civil rights acts, such as the Fair Housing Act (FHA)1 and the Equal Credit Opportunity Act (ECOA)2 defined several protected features (a protected feature is a feature that can present unwanted discrimination towards its values), such as gender, race, skin color, national origin, religion, and marital status (Mehrabi et al. 2019). Discrimination based on the values of such protected features, as they are termed, is considered ethically unacceptable (Mehrabi et al. 2019).

Bias detection techniques aim to reveal underlying bias toward the protected feature. In contrast, bias mitigation techniques are directed toward reducing ML model bias (Mehrabi et al. 2019).

There are three main types of techniques: a pre-processing technique, in which training data distribution is adjusted); an in-processing technique, in which the ML model during training is adjusted; and a post-processing technique, in which the ML model's output is adjusted (Friedler et al. 2019).

In known experiments, a pre-processing technique called re-weighting mitigation (Calders, Kamiran, and Pechenizkiy 2009) was used, which tries to achieve fairness in the training data by replicating data samples. This mitigation technique is based on optimizing the demographic parity fairness measure (Dwork et al. 2012).

The need to detect bias in machine learning (ML) models has led to the development of multiple bias detection methods. However, utilizing them is challenging since each method explores a different ethical aspect of bias, which may result in contradictory output among the different methods; provides an output of a different range/scale and therefore, can't be compared with other methods; and requires different input. Therefore, a human expert needs to be involved to adjust each method according to the examined model.

Many new and existing solutions and services use machine learning (ML) algorithms for various tasks. However, induced ML models are prone to learning real-world behavior and patterns, including unethical discrimination and though inherit bias. Unethical discrimination may even have legal implications (Malgieri 2020). For example, the European General Data Protection Regulation (GDPR) states that the result of personal data processing should be fair. Consequently, the output of the induced ML model should not present any unethical bias. Yet, underlying bias exists in various domains, such as facial recognition (Buolamwini and Gebru 2018), object detection (Wilson, Hoffman, and Morgenstern 2019), commercial advertisements (Ali et al. 2019), healthcare (Obermeyer et al. 2019), recidivism prediction (Chouldechova 2017), and credit scoring (Li et al. 2017).

In order to detect this underlying bias, various methods have been proposed for bias detection and estimation (Hardt, Price, and Srebro 2016; Feldman et al. 2015; Berk et al. 2018; Verma and Rubin 2018; Narayanan 2018; Chouldechova 2017). However, these methods are not applicable to real-life settings for the following reasons:

i) most of the methods produce binary output (bias exists or not). Therefore, comparing the level of bias detected in different models and features is not feasible.

ii) while there are many bias detection and estimation methods, each method explores a different ethical aspect of bias, which may result in contradictory output among the different methods (i.e., one method might determine that the examined ML model is fair, and another might detect underlying bias). Therefore, in order to ensure that there is no bias in an induced ML model, the best practice is to apply an ensemble of all methods.

iii) applying an ensemble of all methods is a challenging task, since the methods should be scaled to produce consistent bias estimations (using the same scale and range).

iv) different methods may require different data parameters as the input. This necessitates a domain expert to determine which methods can be applied to the examined ML model, task, data, and use case, and therefore, entails manual and resource consuming analysis. For example, a method which uses the ground truth labels of samples cannot be used to evaluate an unsupervised ML model.

The main principle that is guiding bias detection methods is the "fairness through unawareness" principle, which can be partially represented by a statistical rule. Existing detection methods produce binary output by determining whether a certain statistical rule is met, and if so, the ML model will be considered to be fair (Verma and Rubin 2018). Some existing methods, such as disparate impact (Feldman et al. 2015) and demographic parity (Dwork et al. 2012), require only the model predictions (i.e., a minimal input). Other methods require ground truth labels, such as equalized odds (Hardt, Price, and Srebro 2016), balance error rate (Feldman et al. 2015), LR+ measure (Feldman et al. 2015), and equal positive prediction value (Berk et al. 2018). Other methods are based on a data property called the risk score. An example of the risk score can be seen in the bank loan granting task. The loan duration can reflect the potential risk for the bank, and therefore, it can be considered a risk score. Examples for such methods are calibration (Chouldechova 2017), prediction parity (Chouldechova 2017), and error rate balance with score (ERBS) (Chouldechova 2017).

Each detection method explores a different ethical aspect. For example, sensitivity (Feldman et al. 2015) states that when the True Positive Rates (TPRs) of each protected feature value are equal, the ML model is considered fair. While the sensitivity method aims to achieve equal TPRs, the equal accuracy method (Berk et al. 2018) aims at achieving equal accuracy for each protected feature value.

Both methods require the ML model predictions and ground truth as the input, yet each one examines a different aspect of the ML model's fairness. For this reason, the two methods may result in inconsistent output (i.e., the sensitivity method might determine that the examined ML model is fair and equal accuracy might not).

In addition, in order to determine which methods can be applied to the examined ML model, a domain expert involvement is required. For example, any detection method that requires ground truth labels, such as treatment equality (Verma and Rubin 2018) and equal false positive rate (Berk et al. 2018), cannot be applied on unsupervised ML models.

In contrast to methods aimed at the detection of bias, there are methods that produce bias estimations (Zliobaite' 2017), i.e., provide a number instead of a binary value. Examples of such methods are the normalized difference (Zliobaite 2015), mutual information (Fukuchi, Kamishima, and Sakuma 2015), and balance residuals (Calders et al. 2013) methods.

The conventional bias estimation methods produce estimations in different ranges and scales. For example, the normalized difference (Zliobaite 2015) method produces estimations that range between [−1, 1], and mutual information (Fukuchi, Kamishima, and Sakuma 2015) produces estimations that range between [0, 1] where zero indicates complete fairness.

The best common practice for a comprehensive evaluation is to apply an ensemble of all methods. However, since each method produces different output, a domain expert is required. For example, in order to adjust the equal accuracy method (Berk et al. 2018) so as to produce a scaled bias estimation, the accuracy of each protected feature value is measured. Then, the accuracy variance is calculated and scaled, using a normalization techniques such as min-max normalization.

In addition, the conventional methods' aim at evaluating the ML model for bias, based on a specific feature, which is defined as targeted evaluation. To allow existing methods to evaluate the bias of an ML model based on all available features, a targeted evaluation should be performed in a brute-force manner. This type of evaluation can be defined as a non-targeted evaluation.

Since many solutions and services use ML algorithms, bias estimation in ML models gains a lot of interest. The conventional methods for bias detection and estimation are limited due to various reasons: i) inconsistent and insufficient outputs; ii) each method explores a different ethical aspect of bias; iii) each method receives different inputs. As a result, it is required to induce an ensemble of the existing methods to perform a full bias detection and estimation.

It is therefore an object of the present invention to provide a system and method for bias estimation in Artificial Intelligence (AI) models, which supports both targeted and non-targeted bias evaluations in a single execution and can be applied to any ML model, without the need for domain experts or ensembled methods.

It is another object of the present invention to provide a system and method for bias estimation in Artificial Intelligence (AI) models, which performs a comprehensive bias estimation based on all of the existing ethical aspects.

It is a further object of the present invention to provide a system and method for bias estimation in Artificial Intelligence (AI) models, which estimates the bias for all of the features simultaneously, to discover indirect bias in the induced ML model, based on features that are correlated with the examined feature.

Other objects and advantages of the invention will become apparent as the description proceeds.

SUMMARY OF INVENTION

A system for bias estimation in Artificial Intelligence (AI) models using a pre-trained unsupervised deep neural network, comprising:

a) a bias vector generator implemented by at least one processor that executes an unsupervised DNN with a predetermined loss function, the bias vector generator is adapted to:
   - a.1) store a given ML model to be examined, having predetermined features;
   - a.1) store a test-set of one or more test data samples being input data samples;
   - b.1) receive a feature vector consisting of one or more input samples;
   - b.2) output a bias vector indicating the degree of bias for each feature, according to the one or more input samples;

b) a post-processor which is adapted to:
   - b.1) receive a set of bias vectors generated by the bias vector generator;
   - b.2) process the bias vectors;
   - b.3) calculate a bias estimation for every feature of the ML model, based on predictions of the ML model; and
   - b.4) provide a final bias estimation for each examined feature.

Targeted and non-targeted bias estimations may be performed in a single execution.

The post-processor may be further adapted to evaluate all ethical aspects by examining how each feature affects the ML model outcomes.

The test-set may consist of at least one sample for each possible examined features values, which are sampled from the same distribution as the training set that was used to induce the examined ML model.

The features may be protected or unprotected features.

The loss function may be adapted to produce vectors that represent the ML model's underlying bias.

The bias vector generator may further comprise a second loss function component, defined by:

$$\min_{B(x)}\left(\sum_{i=1}^{n}\left(1-\delta_{B(x)^i}\right)\right) \quad (2)$$

where $B(x)^i$ is the bias vector B(x) value in the i feature, n is the number of features and $\delta_{B(x)i}$ is a Kronecker delta which is 1 if $B(x)_i=0$ and 0 if $B(x)_i\neq 0$, the second loss function component eliminates bias vectors with all non-zero entries.

The bias vector generator may further comprise a third component defined by:

$$\min_{B^i,B^j}(\mathrm{dif}(B^i,B_j))$$

where $B_i$, $B_j$ are the produced bias vectors for samples $x^i$, $x^j$, respectively, the third component enforces minimal difference between the bias vectors.

The prediction change component may be subtracted from the total loss value, to maximize the change in model prediction.

The feature selection component may be added to the total loss value, to minimize the number of non-zero values in the bias vector.

The similarity component may be added to the total loss value, to minimize the difference between bias vectors in the same training batch.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE EMBODIMENT OF THE INVENTION

Figure 1:
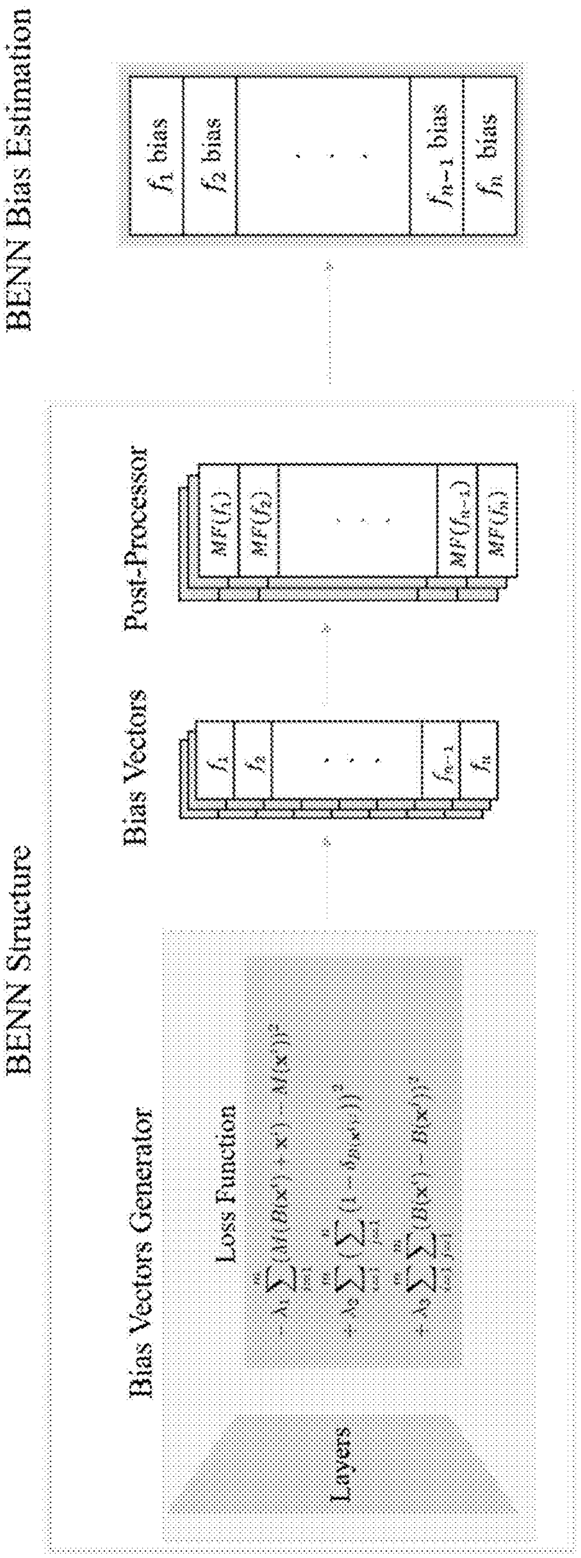
FIG. 1 illustrates the architecture of the system for Bias Estimation using deep Neural Network (BENN), proposed by the present invention.

The present invention provides a system and a method for bias estimation in Artificial Intelligence (AI) models using deep neural network, called Bias Estimation system using deep Neural Network (BENN system). In contrast to the conventional methods, BENN supports both targeted and non-targeted bias evaluations in a single execution. BENN is a generic method which produces scaled and complete bias estimations and can be applied to any ML model without using a domain expert.

The bias estimation method provided by the present invention uses a pre-trained unsupervised deep neural network. Given a ML model and data samples, BENN provides a bias estimation for every feature based on the model's predictions. BENN has been evaluated using three benchmark datasets and one proprietary churn prediction model used by a European Telco and compared it with an ensemble of 21 conventional bias estimation methods. Evaluation results highlight the significant advantages of BENN over the ensemble, as it is generic (i.e., can be applied to any ML model) and there is no need for a domain expert, yet it provides bias estimations that are aligned with those of the ensemble.

Given an ML model and data samples, BENN performs a comprehensive bias analysis and produces a single bias estimation for each feature examined. BENN is composed of two main components. The first component is a bias vector generator, which is an unsupervised DNN with a customized loss function. Its input is a feature vector (i.e., a sample), and its output is a bias vector, which indicates the degree of bias for each feature according to the input sample. The second component is the post-processor, which, given a set of bias vectors (generated by the bias vector generator), processes the vectors and provides a final bias estimation for each feature.

All bias detection and estimation methods are based on the "fairness through unawareness" principle (Verma and Rubin 2018), which means that changes in feature with ethical significance should not change the ML model's outcome.

While existing methods examine only one ethical aspect of this principle, BENN evaluates all ethical aspects by examining how each feature affects the ML outcomes.

BENN was empirically evaluated on three bias benchmark datasets: the ProPublica COMPAS (Angwin et al. 2016), Adult Census Income (Blake and Merz 1998), and Statlog (German Credit Data) (Kamiran and Calders 2009) datasets. In addition, BENN was evaluated on a proprietary churn prediction model (churn quantifies the number of customers who have left a brand by cancelling their subscription or stopping paying for services) used by a European Telco, and used synthetic dataset that includes a biased feature and a fair one, allowing to examine BENN in extreme scenarios. The results of the evaluation indicate that BENN's bias estimations are capable of revealing model bias, while demonstrating similar behavior to existing methods. The results also highlight the significant advantages of BENN over existing methods. These advantages include the fact that BENN is generic and its application does not require a domain expert. Furthermore, BENN demonstrated similar behavior to existing methods after applying a re-weighting mitigation method on the models and datasets to reduce the unwanted bias.

FIG. 1 illustrates the BENN's components and structure, according to an embodiment of the invention. The bias vector generator is an unsupervised DNN with a customized loss function. By using a customized loss function, the bias vector generator is forced to induce a hidden representation of the input data, which indicates the ML model's underlying bias, for each feature. Given a set of bias vectors, the post-processor processes them into a bias estimation result for each feature. BENN receives as an input, a test-set and black-box access to query the ML model examined. Then BENN performs the evaluation and produces bias estimations for all of the features. In order to perform accurate bias analysis, the test-set should consist of at least one sample for each possible examined features values and to be sampled from the same distribution as the training set that was used to induce the examined ML model.

Let X~Dn(FP, FU) be test data samples with n dimensions derived from a distribution D, and FP and FU be sets of protected and unprotected features accordingly.

Let $f_p \in FP$ be a protected feature with values in {0, 1} (as is customary in the field). Let M be the ML model to be examined. For a data sample $x \in X$, let M(x) be M outcome for x.

Bias Vector Generator

During the training of the bias vector generator, a customized loss function is used. The customized loss function has three components, which, when combined, allows to produce vectors that represent the ML model's underlying bias.

The first component of the loss function, referred to as the prediction change component, is defined according to the fairness through unawareness (Verma and Rubin 2018) principle (i.e., the protected features should not contribute to the model decision). It explores the necessary changes that are needed to be performed on a given sample in order to alter its' ML model prediction. This component is defined in Eq. 1:

$$\max_{B(x)}(|M(x) - M(B(x) + x)|) \quad \text{(Eq. 1)}$$

where M(x) is the model M prediction for sample x, M(B(x)+x) is the model outcome for sample x and the corresponding bias vector B(x) element-wise sum. The prediction change component aims to maximize the difference between the original ML model outcome to the outcome after adding the bias vector. According to the fairness through unawareness principle, in a fair ML model the protected features should have a value of zero in the corresponding bias vector entries, since it should not affect the ML outcome.

However, enforcing only the prediction change component, in an attempt to maximize the ML model's outcome change, may result in bias vectors with all non-zero entries.

In order to prevent this scenario, a second loss function component (referred to as the feature selection component) which maximizes the number of entries with zero value, has been introduced (i.e., minimizing the number of entries with non-zero values). This component is defined in Eq. 2:

(Eq. 2)

$$\min_{B(x)}\left(\sum_{i=1}^{n}\left(1-\delta_{B(x)^i}\right)\right) \tag{2}$$

where $B(x)^i$ is the bias vector B(x) value in the i feature, n is the number of features and $\delta_{B(x)i}$ is a Kronecker delta which is 1 if $B(x)_i=0$ and 0 if $B(x)_i\neq 0$. Accordingly, only the features that mostly contribute to the model decision will have non-zero values in their corresponding entries (minimal change in a minimal number of features).

However, given two different samples, the generator may produce two different vectors. Therefore, forcing the two previous components may cause the produced bias vectors to be significantly different. Yet, when bias analysis is performed, the analysis should reflect all combined model decisions (i.e., the analysis should be performed in the feature-level and not in the sample-level).

The third component (referred to as the similarity component) addressed this issue, as it enforces minimal difference between the bias vectors, i.e., for bias vectors $B(x^i)$, $B(x^j)$ and a difference function dif, the $\text{dif}(B(x^i), B(x^j))$ is minimized by the loss function. This component is defined in Eq. 3:

$$\min_{B^i,B^j}(\text{dif}(B^i,B^j)) \tag{Eq. 3}$$

where $B_i$, $B_j$ are the produced bias vectors for samples $x^i$, $x^j$, respectively. Accordingly, the bias vector generator is encouraged to produce similar bias vectors, which reflect the model behavior through all model outcomes.

FIG. 1 illustrates the architecture of the system for Bias Estimation using deep Neural Network (BENN), proposed by the present invention. The illustrated process is for non-targeted bias estimation. The BENN system processes the input using the bias vector generator, which produces one bias vector for each input sample. Then, the post-processor processes the bias vectors, using the mathematical aggregation MF into a bias estimation result for each feature.

The complete loss function is defined in Eq. 4:

(Eq. 4)

$$\mathcal{L}_{BBNN} = -\lambda_1\sum_{i=1}^{m}(M(B(x^i)+x^i)-M(x^i))^2 + \lambda_2\sum_{i=1}^{m}\left(\sum_{j=1}^{n}\left(1-\delta_{B(x^i)^j}\right)\right)^2 + \lambda_3\sum_{i=1}^{m}\sum_{j=1}^{m}(B(x^i)-B(x^j))^2 \tag{4}$$

where x, $x_i$, $x_j$ are samples, $\lambda_1$, $\lambda_2$, $\lambda_3$ are empirically chosen coefficients, $\delta_{B(x)i}$ is a Kronecker delta which is 1 if $B(x)_i=0$ and 0 if $B(x)_i\neq 0$, m is the number of produced vectors and B(x) is the bias vector generated according to x.

The overall goal of the bias vector generator is to minimize the loss value, based on the three components described above. The goal of the prediction change component is to maximize the change in model prediction. Therefore, this component is subtracted from the total loss value (i.e., larger model prediction changes results in smaller loss value). The goal of the feature selection component is to minimize the number of non-zero values in the bias vector. Therefore, this component is added to the total loss value (i.e., smaller number of non-zero values presented in the bias vector, results in a smaller loss value). The goal of the similarity component is to minimize the difference between bias vectors in the same training batch. For this reason, this component is added to the total loss value (i.e., smaller difference between the bias vectors results in smaller loss).

Post-Processor

The main goal of the post processor is to combine the produced bias vectors into a single vector, representing the bias estimation for each feature. The post processor performs a mathematical aggregation by calculating the absolute average of each entry through all the bias vectors. This aggregation is defined in Eq. 5:

(Eq. 5)

$$\text{post}(b_i) = \frac{1}{m}\sum_{j=1}^{m}\left|b_i^{(j)}\right| \tag{5}$$

where $b_i$ is the bias vector entry in the i place and m is the number of produced vectors.

In a targeted evaluation scenario, the values for the pre-defined protected features are extracted from the corresponding entries of the post processor final output.

BENN System Evaluation

The following datasets were used to evaluate BENN:

A. ProPublica COMPAS (Angwin et al. 2016)[3] is a bench-mark dataset that contains racial bias. This dataset was collected from the COMPAS system historical records, which used to assess the likelihood of a defendant to be a recidivist offender. After filtering missing values samples and non-meaningful features, the dataset contains 7,215 samples and 10 features.

B. Adult Census-Income (Blake and Merz 1998)[4] is a benchmark dataset that contains racial and gender-based bias. This dataset corresponds to a task of income level prediction. After filtering missing values samples and non-meaningful features, the dataset contains 23,562 samples, 12 features.

C. Statlog German Credit (Kamiran and Calders 2009)[5] is a benchmark dataset that contains gender-based bias. This dataset corresponds to the task whether the customer should receive a loan. After filtering missing values samples and non-meaningful features, the dataset contains 1,000 samples, 20 features.

D. Telco churn—additional experiments were performed on European Telco churn prediction ML model and dataset. This ML model is a DNN based model, a European Telco proprietary, which determine whether a customer will commit churn, i.e., will stop his subscription with the Telco. The data contains 95,704 samples and 28 features and the protected feature is gender.

E. Synthetic data—in order to preform sanity check, a synthetic dataset was constructed. This dataset contains three binary features, two of them are protected: one of them is a fair feature (has no bias) and one is extremely biased (has maximal bias). The data consist of 305 samples, that composed out of every possible combinations of the features values.

Ensemble Baseline

BENN results were compared to all 21 conventional bias detection and estimation methods: Equalized odds (Hardt, Price, and Srebro 2016), Disparate Impact (Feldman et al. 2015), Demographic parity (Dwork et al. 2012), Sensitivity (Feldman et al. 2015), Specificity (Feldman et al. 2015), Balance Error Rate (Feldman et al. 2015), LR+ measure (Feldman et al. 2015), Equal positive prediction value (Berk et al. 2018), Equal negative prediction value (Berk et al. 2018), Equal accuracy (Berk et al. 2018), Equal opportunity (Hardt, Price, and Srebro 2016), Treatment equality (Verma and Rubin 2018), Equal false positive rate (Berk et al. 2018), Equal false negative rate (Berk et al. 2018), Error rate balance (Narayanan 2018), Normalized difference (Zliobaite 2015), Mutual information (Fukuchi, Kamishima, and Sakuma 2015), Balance residuals (Calders et al. 2013), Calibration (Chouldechova 2017), Prediction Parity (Chouldechova 2017) and Error rate balance with score (ERBS) (Chouldechova 2017).

Due to the differences between the 21 conventional methods outputs, adjustments have been performed for each method that results in producing a scaled bias estimation. The 21 existing methods were adjusted according to their output type: binary bias detection or non-scaled bias estimation. In order to adjust binary bias detection methods into producing a single numeric score, the difference between the two expressions of the method's statistical rule was calculated and the difference was scaled to be between [0, 1] (whenever needed). In case of non-binary examined feature, the method statistical expression value was computed for each possible feature value and used the variance of the different results.

In order to adjust the non-scaled bias estimation methods, their outputs were altered to be ranged between [0, 1], as zero indicates complete fairness. An ensemble based on the 21 conventional methods was constructed in order to create one final result, to which one can compare BENN estimations. Each existing method evaluates different ethical aspect which may result in inconsistent estimations, i.e., one method might determine that the examined ML model is fair and other might detect an underlying bias. By that, the final ensemble baseline result is based on the most restrictive result among the 21 different methods (i.e., the highest bias estimation for each feature). Only the suitable bias detection methods were used in order to construct the baseline (i.e., methods that do not feet the specific use-case and data type were not used). The ensemble baseline final results are presented later in the description.

Evaluation Hypotheses

BENN estimations behavior may be considered similar to the baseline estimations behavior if the following three hypotheses are held:

Firstly, it is needed to assure that BENN will not overlook bias that was detected by one of the 21 conventional methods. Therefore, the first hypothesis states that for a specific feature and a ML model, BENN bias estimation should not be lower than the ensemble baseline estimation. The hypothesis is defined in the condition of Eq. 6:

$$BENN_{fi} \geq baseline_{fi} \quad \text{(Eq. 6)}$$

where $f_i$ is a specific examined feature.

Secondly, it is needed to assure that BENN will maintain the same features estimations order (ranking) as the order produced by the ensemble baseline. The second hypothesis states that the ranks of BENN estimations and the ensemble baseline estimations should be identical, i.e., by ranking the features based on their estimations in a descending order, BENN and the baseline should result in an identical ranking. The hypothesis is defined in Eq. 7:

$$\text{rank}(BENN_{fi}) = \text{rank}(baseline_{fi}) \quad \text{(Eq. 7)}$$

where $f_i$ is a specific feature and rank is the bias estimation rank.

Third, it is needed to be assured that the calculated differences between BENN estimations to the ensemble estimations will be similar (variance close to zero), for all the features in the data. This hypothesis is defined by Eq. 8:

$$BENN_{fi} - baseline_{fi} \approx BENN_{fj} - baseline_{fj} \quad \text{(Eq. 8)}$$

where $f_i$, $f_j$ are examined features. The third hypothesis assures that the differences between BENN and the ensemble baseline are consistent (not random) throughout all data features.

Experiments Settings

All experiments performed on CentOS Linux 7 (Core) operation system using 24 G of memory and nVidia RTX 2080 Ti GPU. All the experiments code and BENN construction were build using Python 3.7.4, Tensorflow-gpu 2.0.0, Scikit-learn 0.22 and Numpy 1.17.4.

The structure properties of the bias vector generator (layers specifics, optimization function, etc.) are empirically chosen and were constructed as follows: The bias vector generator constructed from eight dense layers with 40 units and rectified linear unit (ReLU) as an activation function. The output layer has number of units as the number of data features and hyperbolic tangent (tan h) function was used for the activation function. The weights and biases initialization was randomly selected. In order to determine the lambda parameters values, experiments were performed using each possible value in the range [0, 1] in steps of 0.01, for each lambda. Accordingly, lambda values were empirically set to be equal to one. BENN was trained using mini-batch gradient descent with batch size of 128 and 300 epochs in all of the experiments. For each dataset a decision tree classifier was induced, using the Scikit Learn library (Scikit-learn is the most useful library for machine learning in Python. The Scikit-learn library contains a lot of efficient tools for machine learning and statistical modeling including classification, regression, clustering and dimensionality reduction) with the decision tree constructor default parameters. In order to train and evaluate the classifiers, 5-folds cross validation was used for each corresponding dataset, while splitting the dataset to train set and test set accordingly. The test sets were used to perform the bias evaluations.

As noted, for a proper bias evaluation the test set should consist at least one sample for each examined feature possible values. For that reason, different seeds were defined for different dataset, as ProPublica COMPAS seed was 31, Adult Census-Income was 22 and Statlog German Credit was 2. In the churn use-case, a European Telco proprietary ML model was used, therefore an additional model were not induced.

Two experimental settings were defined: the original setting, which uses the original dataset without any changes; and the mitigate setting, which uses the mitigated dataset produced by re-weighting mitigation technique (Calders, Kamiran, and Pechenizkiy 2009). The mitigation technique parameters were set as follows: the weights of the positive contribute replications were set as one, the other replications set as 0.1 and the stopping criterion was defined as the probability variance threshold. The probability variance threshold was defined as the variance of the probabilities for each protected feature group to get the positive outcome. When the probability variance reaches to the probability variance threshold, the sample replication process stops. The variance threshold was set as 0.0045 for the ProPublica COMPAS and Adult Census-Income, 0.0003 for Statlog German Credit and 0.00003 for the churn provided data.

Experimental Results

Table 1 presents the experiments results according to the original setting (not mitigation setting) based on the synthetic data (fair and biased features), COMPAS (race, gender and age), Adult (race and gender), German Credit (gender) and Churn prediction (gender). For each use-case, the table present: the ensemble baseline and BENN bias estimations, the use-case ranks, the differences between the produced estimations and the differences variance for every protected feature. The benchmark use-cases (COMPAS, Adult, German Credit) results were validated by 5-fold cross validation with standard deviation that was below 0.02 for every feature in every use-case.

use-case the ensemble baseline estimation for the gender feature was 0.29, BENN estimation was 0.5366 therefore, all the hypotheses were held: BENN estimation was higher than the ensemble baseline estimation; there is only one protected feature so the second and third hypotheses are degenerated.

Figure 2:
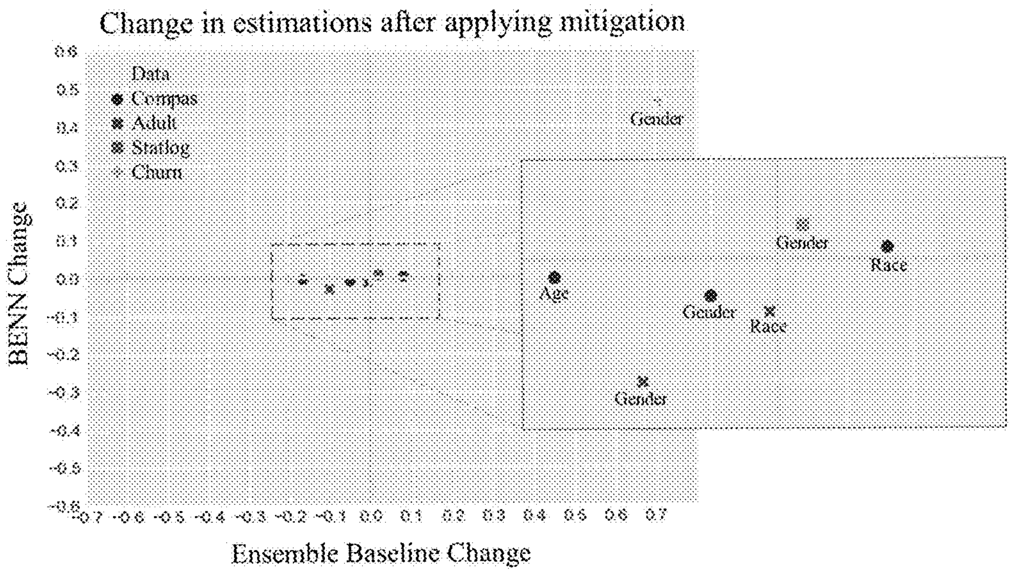
FIG. 2 presents experiments results for the mitigation setting based on COMPAS, Adult, German Credit and Churn prediction, after performing mitigation.

FIG. 2 presents the experimental results for the mitigation setting based on COMPAS (race, gender and age features), Adult (race and gender features), German Credit (gender feature) and Churn prediction (gender feature), after performing mitigation. For each experiment, the charts present the observed change in BENN estimations after the mitigation was applied (y-axis) for each corresponding observed change in the ensemble baseline (x-axis) in each use-case. The benchmark use-cases results were validated by 5-fold cross validation and a standard deviation was below 0.02 for every feature in every use-case. Overall, BENN produced estimations behave similarly to the ensemble baseline, i.e., both estimation changes have the same direction (sign). For every examined feature in every dataset, negative change in the baseline bias estimation, corresponds with negative change in BENN estimations and vice versa. Therefore, the estimations change to the same direction and exhibit similar behavior.

In the graph, each plotted point is a protected feature observed change. The x axis is the baseline observed change after the mitigation. The y axis is BENN observed change after the mitigation.

TABLE 1

Experiments results over experimental databases

| | | Synthetic data | | COMPAS | | | Adult | | German Credit | Churn Prediction |
|---|---|---|---|---|---|---|---|---|---|---|
| | | Fair | Biased | Race | Gender | Age | Race | Gender | Gender | Gender |
| Estimation | Baseline | 0 | 1 | 0.4513 | 0.2955 | 0.3848 | 0.5304 | 0.6384 | 0.2215 | 0.29 |
| | BENN | 0.0536 | 0.9948 | 0.662 | 0.5101 | 0.6529 | 0.604 | 0.6905 | 0.5293 | 0.5366 |
| Rank | Baseline | 2 | 1 | 1 | 3 | 2 | 2 | 1 | 1 | 1 |
| | BENN | 2 | 1 | 1 | 3 | 2 | 2 | 1 | 1 | 1 |
| Difference | | 0.0536 | −0.0052 | 0.2108 | 0.2146 | 0.2681 | 0.0737 | 0.0521 | 0.3078 | 0.2466 |
| Difference variance | | 0.0017 | | | 0.001 | | 0.0002 | | 0 | 0 |

Overall, BENN produced estimations held all the hypotheses with respect to the ensemble base-line. In the synthetic data results, both BENN and the ensemble baseline produced a bias estimation of ~0 for the fair feature and a bias estimation of ~1 for the biased feature. Thus, BENN successfully estimate the extreme scenarios of complete fair and complete bias features. In the COMPAS use-case the ensemble baseline estimations ranges between [~0.29, ~0.45], BENN estimations ranges between [~0.51, ~0.66]. All hypotheses were held: BENN estimations were higher than the ensemble baseline estimations for every feature; the estimation ranks are identical for the ensemble baseline and BENN; and the differences variance is 0.001. In the Adult use-case the ensemble baseline estimations ranges between [~0.53, ~0.63], BENN estimations ranges between [~0.6, ~0.69]. All hypotheses were held: BENN estimations were higher than the ensemble baseline estimations for every feature; the estimation ranks are identical for the ensemble baseline and BENN; and the differences variance is 0.0002. In the German Credit use-case the ensemble baseline estimation for the gender feature was 0.2215, BENN estimation was 0.5293 therefore, all hypotheses were held: BENN estimation was higher than the ensemble baseline estimation; there is only one protected feature so the second and third hypotheses are degenerated. In the Churn prediction In most empirical research fields of ML, suggested novel methods are compared against state-of-the-art ones. However, in the ML bias detection and estimation field, one might encounter difficulties when comparing new method:

i) this is a relatively new field and new methods are induced frequently. Therefore, outperforming conventional methods is insufficient;

ii) each existing method produces estimations in a different way, i.e., each method is suitable for a different use-case, required different input and examines different ethical expect;

iii) since each method outputs estimations in a different scale and range, one cannot simply compare their output as done by using common performance measurements (accuracy, precision etc.).

The present invention composes: i) research hypotheses which BENN had to hold, in order to conduct a field-adapted research; ii) an ensemble of the existing methods to perform a full bias estimation. According to the experiments settings, the empirically chosen lambda parameters for all three components: the prediction change component, the feature selection component and the similarity component are exactly 1. One can learn from this that each one of the loss function components equally contributes to the bias estimation task. This finding emphasizes the need to use all three components in order to properly estimate bias.

As a DNN-based solution, BENN exhibits multiple benefits such as the ability to learn significant patterns within the data during training and the ability to remove the dependency in the data ground truth labels (unsupervised learning).

Experimental results on three benchmark datasets and one proprietary churn prediction model used by a European Telco, indicate that BENN produced estimations are capable of revealing ML models bias, while demonstrating similar behavior to existing methods, represented by an ensemble baseline. Furthermore, experimental results on synthetic data indicate that BENN is capable of correctly estimate bias in extreme scenarios. Additional experimental results on the same use-cases after re-weighting mitigation technique indicate that BENN behave similarly to the ensemble baseline. By those results, BENN can be considered as a complete bias estimation technique.

BENN may be adapted to perform bias estimating in unstructured data scenarios. When using unstructured data (such as image datasets), the protected feature may not be explicit presented in the data. For example, the feature gender is not explicitly noted in a face recognition image dataset, as each image is not tagged according to the gender of its subject. In theory, utilizing object detection and classification solutions to extract the wanted feature from the data can be performed. In addition, input representation change can be performed to extract a more dense representation of the input (as the use of convolutions). Combining both object detection and classification solutions and changing the input representation may result in ML model and data that can be evaluated using BENN.

The main contributions of the present invention are as follows:

- BENN is the first bias estimation method which utilizes an unsupervised deep neural network. Since DNNs are able to learn significant patterns within the data during training, BENN performs a more in depth bias examination than existing methods.
- In contrast to conventional methods which focus on just one ethical aspect, BENN performs a comprehensive bias estimation based on all of the ethical aspects currently addressed in the literature.
- BENN is a generic method which can be applied to any ML model, task, data, and use case evaluation; therefore, there is no need for domain experts or ensembles.
- While all bias estimation methods are targeted at assessing bias in one feature at a time, BENN estimates the bias for all of the features simultaneously (non-targeted). This enables the discovery of indirect bias in the induced ML model, i.e., discovering bias based on features that are correlated with the examined feature (Mehrabi et al. 2019).

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

The invention claimed is:

1. A system for bias estimation in Artificial Intelligence (AI) models using a pre-trained unsupervised deep neural network (DNN), comprising:

a) a bias vector generator implemented by at least one processor that executes an unsupervised DNN with a predetermined loss function, said bias vector generator is adapted to:
   - a.1) store a given ML model to be examined, having predetermined features;
   - a.2) store, in a database connected to the DNN a test-set of a plurality of one or more test data samples being input data samples using three or more benchmark datasets;
   - a.3) receive a plurality of feature vectors, each of which is defined by a feature of one of the input samples;
   - a.4) output a bias vector indicating a degree of bias for a given feature, whereby one bias vector is output for each input samples;
   - a.5) query the given ML model to be examined with each input data sample to obtain a first prediction;
   - a.6) generate, by the unsupervised DNN, a second bias vector for the input data sample and apply the second bias vector to the input data sample to form a modified input data sample; and
   - a.7) query the given ML model to be examined with the modified input data sample to obtain a second prediction, wherein the predetermined loss function is configured to train the unsupervised DNN based on a difference between the first prediction and the second prediction; and b) a post-processor which is adapted to:
   - b.1) receive a set of bias vectors generated by said bias vector generator;
   - b.2) process said set of bias vectors by aggregating an absolute set average calculated for each of said bias vectors; and
   - b.3) provide a final bias estimation for the given feature.

2. The system according to claim 1, in which targeted and non-targeted bias estimations are performed in a single execution.

3. The system according to claim 1, in which the post-processor is further adapted to evaluate all ethical aspects by examining how each feature affects the ML model outcomes.

4. The system according to claim 1, in which the test-set consists of at least one sample for each possible examined features values, being sampled from the same distribution as the training set that was used to induce the examined ML model.

5. The system according to claim 1, in which the features are protected or unprotected features.

6. The system according to claim 1, in which the loss function produces vectors that represent the ML model's underlying bias.

7. The system according to claim 1, in which the bias vector generator further comprises a second loss function component $$\min_{B(x)}\left(\sum_{i=1}^{n}\left(1-\delta_{B(x)^i}\right)\right) \quad (2)$$

where $B(x)^i$ is the bias vector B(x) value in the i feature, n is the number of features and $\delta_{B(x)i}$ is a Kronecker delta which is 1 if $B(x)_i=0$ and 0 if $B(x)_i\neq 0$, said second loss function component eliminates bias vectors with all non-zero entries.

8. The system according to claim 7, in which the bias vector generator further comprises a third component defined by:

$$\min_{B^i,B^j}(\mathrm{dif}(B^i,B^j))$$

where $B^i$, $B^j$ are the produced bias vectors for samples $x^i$, $x^j$, respectively, said third component enforces minimal difference between the bias vectors.

9. The system according to claim 1, in which a prediction change component is subtracted from a total loss value, to maximize the change in model prediction.

10. The system according to claim 7, in which the second loss function component is added to a total loss value, to minimize a number of non-zero values in the bias vector.

11. The system according to claim 8, in which the third component is added to a total loss value, to minimize the difference between bias vectors in a same training batch.

12. The system according to claim 1, in which the bias vector generator is adapted to store, in the database connected to the DNN, the test-set of a plurality of test data samples additionally using a proprietary churn prediction model.

13. The system according to claim 1, in which the plurality of feature vectors is extracted from unstructured data based on object detection and classification solutions, and the final bias estimation is calculated in reference to the plurality of extracted feature vectors.

14. The system according to claim 13, in which the plurality of feature vectors is extracted in an object detection or facial recognition process.

* * * * *